United States Patent [19]
Acres et al.

[11] 4,163,736

[45] Aug. 7, 1979

[54] METHOD OF PRODUCING PLATINUM-CLAD ARTICLES

[75] Inventors: Gary J. K. Acres; Alan S. Darling, both of London, England

[73] Assignee: Johnson, Matthey & Co., Limited, London, England

[21] Appl. No.: 772,739

[22] Filed: Feb. 28, 1977

Related U.S. Application Data

[60] Continuation of Ser. No. 558,689, Mar. 17, 1975, abandoned, which is a division of Ser. No. 263,169, Jun. 15, 1972, abandoned.

[30] Foreign Application Priority Data

Jun. 16, 1971 [GB] United Kingdom ............... 28315/71

[51] Int. Cl.$^2$ ...................... B01J 21/04; B01J 23/40; B01J 35/02
[52] U.S. Cl. ........................ 252/466 PT; 252/477 R; 427/34; 427/214
[58] Field of Search .................... 252/466 PT, 477 R; 148/6.27, 6.30; 427/34, 376 A, 404, 419 A, 423, 430 R, 633, 670

[56] References Cited

U.S. PATENT DOCUMENTS

| | | | |
|---|---|---|---|
| 3,565,830 | 2/1971 | Keith et al. | 252/466 PT |
| 3,736,109 | 5/1973 | Darling et al. | 29/195 |

*Primary Examiner*—W. J. Shine
*Attorney, Agent, or Firm*—Cushman, Darby & Cushman

[57] ABSTRACT

This invention describes an article which may be used at high temperatures under non-oxidizing or reducing conditions. The article comprises a core made from a refractory compound, a sheath of a platinum group metal or of an alloy based on at least obe metal of the platinum group enclosing the core and a barrier layer of magnesia intermediate the core and the sheath.

3 Claims, No Drawings

METHOD OF PRODUCING PLATINUM-CLAD ARTICLES

This is a continuation of application Ser. No. 558,689 filed Mar. 17, 1975, now abandoned, which is a division of Ser. No. 263,169, filed June 15, 1972, now abandoned.

This invention relates to the cladding or coating of refractory compounds with a mixture or alloy of one or more of the platinum group metals or an alloy based on at least one platinum group metal. It also relates to the heterogeneous catalysis of gas phase reactions; more particularly, it relates to gas phase reactions of this type in which one or more supported platinum group metals, in mixture or alloy form, is a constituent of the catalyst.

In our British Pat. Nos. 1,190,266 and 1,195,349 there are disclosed articles comprising a core of refractory metal such as niobium, tantalum, chromium, molybdenum or tungsten or an alloy thereof, a sheath comprising a platinum group metal or an alloy based on at least one platinum group metal and a barrier layer disposed between the metal core and the sheath to prevent contact between them. The barrier layer may for example be a refractory compound such as a refractory oxide, nitride, carbide, sulphide or silicide.

Heterogeneous catalysis of gas phase reactions is now used very widely in those industries where it is important that contaminated effluent gases should not be vented to the atmosphere. One example is the internal combustion engine, either petrol or diesel; another example is the removal of oxides of nitrogen from the tail or waste gas resulting from the manufacture of nitric acid by the oxidation of ammonia. In both these examples a known system of purification envisages the use of a reducing fuel to react with the potential contaminants.

This invention is concerned with the heterogeneous catalysis of gas phase reactions which take place in a reducing rather than an oxidising system. The gaseous medium in which the reactions take place are therefore those having very low oxidising potential and if oxygen is present, it is present in quantities less than, usually very much less than, the quantities necessary for any stoichiometric reaction to take place.

One or more supported platinum group metals are frequently used for the catalysis of reactions of this kind. The ultimate support is often a ceramic material such as mullite or zircon-mullite in particle or honeycomb form. The use of ceramic honeycomb ultimate supports is now much more frequently preferred, and is in fact preferred in the article of the present invention, because of the much lower back-pressure generated in gas phase reactions and the much lower rate of attrition of the catalyst. In using such ceramic honeycombs, it has been found necessary to provide them with an intermediate coating (often called a "wash-coat") of a refractory metal oxide. The refractory metal oxide coating is preferably in the form of a film deposited upon the ceramic honeycomb supports (either continuously or discontinuously) which is from 0.0004–0.001 inches thick. The refractory metal oxide coating is preferably precalcined, and is itself characterised by a porous structure having a large internal pore volume and total surface area. It is therefore referred to as an "active" (i.e. catalytically active) refractory metal oxide.

Up to the present time, it has been preferred to use one or more members of the gamma or activated alumina family as the wash-coat. Many other refractory metal oxides however, have been proposed and their use attempted.

In U.S. Pat. No. 3,736,109 it is disclosed that under conditions of very low oxygen partial pressure, that is less than one micron, and at operating temperatures of the order of 1,000° C. many well known and stable refractory compounds which may be used as barrier layers decompose in contact with solid platinum group metals and alloys based upon platinum group metals. It is further disclosed that in contradistinction to many of the well known refractory materials which may act as barrier layers, magnesia did not decompose under these conditions.

It has now been determined that similar considerations apply at lower temperatures and under conditions in which, although they may still be described as reducing conditions, considerably more oxygen or oxidising potential is present than an oxygen partial pressure of one micron.

According to the present invention, an article for use at high temperatures and under non-oxidising or reducing conditions comprises a core made from a refractory compound, a barrier layer of magnesia and a sheath of a platinum group metal or of an alloy based on at least one metal of the platinum group.

The refractory compound comprising the core of the article preferably comprises:

(a) refractory oxides (i.e. oxides which are themselves refractory; not necessarily the oxides of refractory metals);

(b) refractory carbides;

(c) refractory nitrides (for example, boron nitride and silicon nitride $Si_3N_4$);

(d) refractory sulphides;

(e) refractory silicides; and (f) ceramic materials. Suitable ceramic materials are mullite, zircon-mullite, alumina (particularly alpha alumina), sillimanite, magnesium silicates, zircon, petalite, spodumene, cordierite and alumino silicates.

Oxides or mixtures of oxides of one or more of the following elements come within category (a) above: magnesium, calcium, strontium, barium, aluminium, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten, and uranium. The oxide or mixture of oxides which is used should be unreactive with any of the gaseous constituents present in the operation of the process for which the article is used. Under conditions of operation it is also, of course, unreactive with magnesia.

In a preferred embodiment of the present invention, an article for use at high temperature and under reducing or substantially non-oxidising conditions comprises a catalyst having a refractory metal oxide core in the form of a ceramic honeycomb, a barrier layer of magnesia in the form of a magnesia wash-coat deposited upon the ceramic honeycomb and a sheath in the form of a catalytically active coating of a platinum group metal or of an alloy based on at least one metal of the platinum group deposited upon the wash-coat of magnesia. In this embodiment, "use at high temperature" normally means use at a temperature within the range 300°–1,000° C. and more commonly at a temperature greater than 500° C.

In an alternative embodiment which might have application in the gas turbine and jet engine fields, articles according to this invention may be used at temperatures of up to 1500° or 1600° C. In this case the core of refractory compound might be made of a carbide, a silicide or a nitride, e.g. silicon nitride, $Si_3N_4$ and the refractory core would not be in the form of a honeycomb, but might possibly be shaped or moulded in the shape of a turbine blade or a combustion cone. In the latter case, the article according to the invention would have the dual purpose of a high temperature shield and a catalyst.

The magnesia barrier layer is preferably deposited upon the core of refractory compound in the form of a continuous film which may range from 0.0004–0.5 inches thick according to the application for which the final article is to be used. If the application is mainly catalytic, the layer of magnesia is preferably 0.0004–0.001 inches thick. It is characterised by a porous structure and large internal pore volume and total surface area. Under operating conditions, catalysts of this type show remarkable stability at high temperature and complete inertness towards the platinum group metals with which they may be in contact.

If the finished article is intended mainly for use as a high temperature heat shield, the magnesia barrier layer is preferably flame-or-plasma-sprayed on to the core material to provide a coating about 0.1 inches thick. Articles in this form having an outer platinum sheath 0.02 inches thick have been found to have a life of over 2,500 hours at an operating temperature of 1400° C. compared with a life of 2,000 hours for a zirconia barrier layer. A small quantity of a vitreous material, such as a borosilicate glass, which behaves as a viscous material at temperatures above 1,000° C. may be flame- or plasma-sprayed with the magnesia in forming the barrier layer as we have found that this assists in adhesion to the core.

When the final use of the article according to the invention is mainly catalytic, the magnesia may be deposited upon the core in several ways. One method might involve dipping the core into a solution of a salt of magnesium and calcining to decompose the salt to the oxide. Another and preferred method comprises dipping the support into an aqueous suspension, dispersion or slurry of the oxide itself, drying and calcining. In this method dispersions or suspensions having a solid content of from 10–70% by weight can be used to deposit a suitable amount of magnesia on to the core in a single application. Cladding of the magnesia barrier layer with a mixture or alloy on one or more of the platinum group metals may be accomplished by known methods of deposition of catalytically active metals on to support materials. For example, if a ceramic honeycomb structure is used with a high surface area the core with deposited barrier layer may be immersed in a solution of a water soluble inorganic salt or salts of the platinum group metals; for example, a mixture of chloroplatinic acid and rhodium trichloride solutions may be used. When immersed, the mixture is agitated to ensure uniform distribution and the metal or alloy is precipitated by chemical or thermal reduction or the compounds themselves may be precipitated on to the barrier layer. The metal may then be prepared and activated by conventional techniques.

Alternatively, in a method of making an article according to this invention, the core material is first coated with a layer of metallic magnesium by hot-dipping, galvanising or any other method. The so coated core is then encapsulated in the sheath material. Thereafter, the encapsulated material core is subjected to oxidation treatment so that the magnesium metal is oxidised in situ to magnesia. Oxidation may be carried out at moderately high temperatures by the use of steam or other oxidising atmospheres.

If desired, the intermediate layer of magnesia may be obtained by, for example, first casting molten magnesium into the space between the sheath and the core and subsequently forming the sheath to encapsulate the so-formed core/barrier layer assembly. Another alternative method according to the present invention includes pre-calcining thin sheets of magnesium metal which are tightly wrapped around the core prior to sheathing. The effect of oxidation will be to expand the barrier layer material so that it completely fills the space between the sheath and the core.

It is also known that a ceramic material which acts as a catalyst support may be stabilised by heating to at least 0.4 times its melting point in degrees Kelvin. A so-treated ceramic is very much more durable under operating conditions without any sacrifice in the activity of the catalyst. Activation of the magnesia barrier layer may be carried out prior to its deposition upon the core material, or subsequent thereto, or even after the platinum cladding has been positioned. Usually, however, the magnesia is calcined or partially calcined before deposition upon the core material, or after deposition but before cladding with the platinum group metal component.

Articles according to the present invention when used as catalysts for pollution control may be expected to have an active life of up to 2½ years. Palladium on ceramic honeycomb catalysts with intermediate barrier layers of alumina exhibit acceptable ignition temperatures but have been found to be unstable at operating temperatures and have been known to fail in one month. Articles according to the present invention exhibit excellent catalytic activity with exceptionally good stability under reducing conditions at elevated temperatures. They may, therefore, be used in the catalytic purification of exhaust from internal combustion engines (either petrol or diesel) and as igniters for natural gas, where strongly reducing conditions are present.

Hitherto when platinum thermocouples were heated in contact with zirconia powder under gettered argon, severe reactions occurred at temperatures as low as 1100° C. Similar reactions occur with alumina and thoria. In vacuum similar reactions occur, although at a slower rate than those in argon.

In corresponding tests with magnesia as the insulating oxide material, very few signs of reaction between the platinum and magnesia were detected even under conditions of very low oxidising potential, whereas disastrous failure would have occurred with alumina as the insulating oxide after only a few hours at operating temperatures.

After 100 hours of test at 1650° C. in magnesia, under an atmosphere of gettered argon, the calibration of a standard platinum versus 13% rhodium-platinum thermocouple changed by less than 1% when retested at the gold point. A similar thermocouple was run for 450 hours at 1650° C. in magnesia under purified argon. Recalibration at the palladium point indicated a decrease in output equivalent to 4° C. which at this temperature cannot be considered a serious deterioration. Under similar conditions of test thermocouples immersed in alumina remain intact for a few hours only. Although aluminium is rapidly taken up from vapours having pressures of the order of $10^{-10}$ Torr (1 micron = $10^{-3}$ Torr), few signs of magnesium contamination have been detected even when magnesium vapours of the order of $10^{-7}$ Torr must have been present in the vicinity of the platinum wire surface.

Articles formed in accordance with the invention may have applications other than those hereinbefore set out. For example, solid state electrolytic probes are known for determining the oxidising potential of highly reducing gases, such probes comprising platinum electrodes in an electrolyte consisting of calcium stabilised zirconia.

Difficulties have been encountered due to reaction between the platinum electrodes and the zirconia which after several hours of use interfere with the successful operation of the instrument. To avoid this a layer of magnesia may be applied between the platinum electrode and the stabilised zirconia membrane so that no chemical reactions result with the platinum electrode even under strongly reducing conditions at high temperatures.

Such layers of magnesia should be thick enough to provide a chemically inert barrier between the platinum and zirconia but should on the other hand be sufficiently thin to produce no serious effect on the electrical conductivity or the electrochemical potential at the interface.

A magnesia layer may further be employed as a barrier layer between platinum heaters, and refractory supports therefor used for the ignition of natural gas. It has been determined that sprayed platinum deposits and platinum deposits applied by conventioal printing and firing ceramic techniques have a longer life when used for igniting natural gas when carried by magnesia supports than when carried by alumina supports.

One difficulty sometimes encountered with the application of magnesia to refractory surfaces arises from its high volatility at elevated temperatures. Due to this volatility it is sometimes difficult to apply magnesia layers or deposits either by flame-spraying or by plasma-spraying techniques.

This spraying difficulty can be largely overcome by applying the magnesia layer not as pure magnesia but as magnesia admixed with a small amount of alumina. This slight degradation with alumina facilitates spraying by apparent reduction of the volatility of the magnesia and the resultant deposit has the chemical characteristics of magnesia rather than of alumina and has much superior mechanical properties. These characteristics are quite acceptable for many applications and the tendency to be reduced by platinum at high temperatures is much less than that of alumina or aluminous compounds.

The present invention also includes gases which have been processed by an article according to the invention.

What we claim is:

1. A method of producing an article operative at high temperatures and under non-oxidizing or reducing conditions comprising a core made from a refractory compound, a sheath of a platinum group metal or of an alloy based on at least one metal of the platinum group enclosing the core and a barrier layer intermediate the core and the sheath, comprising flame spraying onto the core a mixture of magnesia and a small amount of alumina to form said barrier layer and subsequently applying the platinum group metal or alloy over said barrier layer, the refractory core being selected from the group consisting of refractory oxides, carbides, nitrides, sulphides, silicides and ceramic materials and the amount of alumina in said mixture being such that it facilitates spraying while retaining the chemical characteristics of magnesia rather than alumina in the resultant deposit.

2. A method according to claim 1 wherein the magnesia is at least partially calcined prior to or subsequent to its deposition upon the core material.

3. A method according to claim 1 wherein the core carrying the deposited magnesia barrier layer is immersed in a solution of a water soluble inorganic salt or salts of the platinum group metal or metals and the metal or alloy is precipitated on the barrier layer by chemical or thermal reduction, the precipitated layer being subsequently activated.

* * * * *